(12) United States Patent
He et al.

(10) Patent No.: US 9,451,247 B2
(45) Date of Patent: Sep. 20, 2016

(54) CAMERA TEST APPARATUS

(71) Applicant: UL LLC, Northbrook, IL (US)

(72) Inventors: Fan He, Gurnee, IL (US); Paul W. Brazis, Jr., South Elgin, IL (US)

(73) Assignee: UL LLC, Northbrook, IL (US)

( * ) Notice: Subject to any disclaimer, the term of this patent is extended or adjusted under 35 U.S.C. 154(b) by 26 days.

(21) Appl. No.: 14/550,670

(22) Filed: Nov. 21, 2014

(65) Prior Publication Data

US 2015/0146016 A1    May 28, 2015

Related U.S. Application Data

(60) Provisional application No. 61/908,676, filed on Nov. 25, 2013.

(51) Int. Cl.
| | |
|---|---|
| *H04N 17/00* | (2006.01) |
| *G03B 43/00* | (2006.01) |
| *H04N 5/232* | (2006.01) |
| *H04N 5/235* | (2006.01) |

(52) U.S. Cl.
CPC ............ *H04N 17/002* (2013.01); *G03B 43/00* (2013.01); *H04N 5/2354* (2013.01); *H04N 5/23203* (2013.01)

(58) Field of Classification Search
CPC .. H04N 17/002; H04N 17/00; H04N 17/004; H04N 17/02; G06T 7/0018; G06T 7/002
USPC ........ 348/187, 188, 180; 324/750.01, 750.26
IPC ...................................................... H04N 17/00
See application file for complete search history.

(56) References Cited

U.S. PATENT DOCUMENTS

| | | | |
|---|---|---|---|
| 4,336,580 | A | 6/1982 | Mouyard et al. |
| 4,400,731 | A | 8/1983 | Brown |
| 5,760,829 | A | 6/1998 | Sussmeier |

(Continued)

FOREIGN PATENT DOCUMENTS

| | | |
|---|---|---|
| EP | 1628494 A1 | 2/2006 |
| EP | 2116890 A1 | 11/2009 |
| EP | 2203032 A2 | 6/2010 |

OTHER PUBLICATIONS

Search Report for European Application No. 14194591.5, dated Mar. 25, 2015.

(Continued)

*Primary Examiner* — Sherrie Hsia
(74) *Attorney, Agent, or Firm* — Marshall, Gerstein & Borun LLP

(57) ABSTRACT

A camera testing apparatus includes a frame assembly, a control unit, and a plurality of first light sources and second light sources coupled to the frame assembly and in communication with the control unit. Each of the first and second light sources is in one of an illuminated first state or a non-illuminated second state, and each of the plurality of first and second light sources is adapted to be within a field of vision of a camera disposed remote from the first and second light sources. The control unit sends a first command to each of the first light sources to change a first operational parameter. The control unit sends a second command to a first one of the second light sources to illuminate at a first brightness and a third command to a second one of the second light sources to illuminate at a second brightness.

27 Claims, 10 Drawing Sheets

(56) References Cited

U.S. PATENT DOCUMENTS

| | | |
|---|---|---|
| 6,473,062 B1 | 10/2002 | Debiez et al. |
| 6,850,169 B2 | 2/2005 | Manavi et al. |
| 7,068,302 B2 | 6/2006 | Ebenstein et al. |
| 7,252,408 B2 | 8/2007 | Mazzochette et al. |
| 7,403,229 B2 | 7/2008 | Knoedgen et al. |
| 7,406,189 B2 | 7/2008 | Ganz et al. |
| 7,486,309 B2 | 2/2009 | Knoedgen et al. |
| 7,561,036 B2 | 7/2009 | Pederson |
| 7,629,998 B2 | 12/2009 | Elberbaum |
| 7,697,031 B2 | 4/2010 | Knoedgen et al. |
| 7,728,616 B2 | 6/2010 | Park et al. |
| 7,944,153 B2 | 5/2011 | Greenfeld |
| 7,948,519 B2 | 5/2011 | Knoedgen et al. |
| 7,965,316 B2 | 6/2011 | Knoedgen et al. |
| 8,028,909 B2 | 10/2011 | Brock et al. |
| 2003/0142044 A1 | 7/2003 | Berry |
| 2004/0066965 A1 | 4/2004 | Watanabe et al. |
| 2005/0162517 A1 | 7/2005 | Fujihara et al. |
| 2005/0219363 A1 | 10/2005 | Kohler et al. |
| 2005/0219365 A1 | 10/2005 | DiCarlo et al. |
| 2007/0159532 A1 | 7/2007 | Kiyokawa |
| 2007/0176192 A1 | 8/2007 | Leatherdale et al. |
| 2008/0013314 A1 | 1/2008 | Ashdown et al. |
| 2008/0068192 A1 | 3/2008 | Ashdown et al. |
| 2010/0027293 A1 | 2/2010 | Li |
| 2011/0068699 A1* | 3/2011 | Knapp ............... H04L 12/43 315/158 |
| 2012/0293666 A1 | 11/2012 | Wong et al. |
| 2013/0003345 A1 | 1/2013 | Hamby et al. |
| 2013/0003373 A1 | 1/2013 | Hamby et al. |
| 2013/0257286 A1 | 10/2013 | Chang et al. |

OTHER PUBLICATIONS

Santos, Bjoy, "Optical feedback extends white LEDs' operating life," Thompson et al., ed. Intersil Corp, Milpitas, California, Jan. 2007.

* cited by examiner

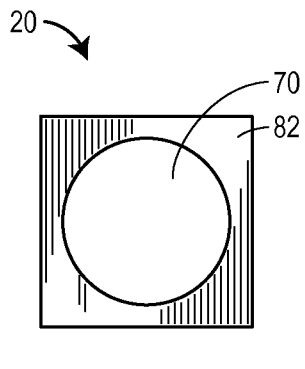 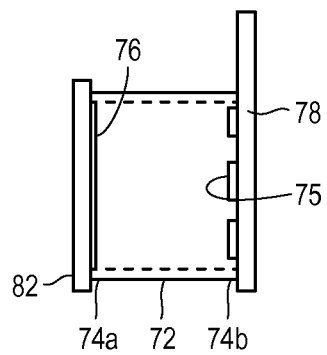
FIG. 3A  FIG. 3B
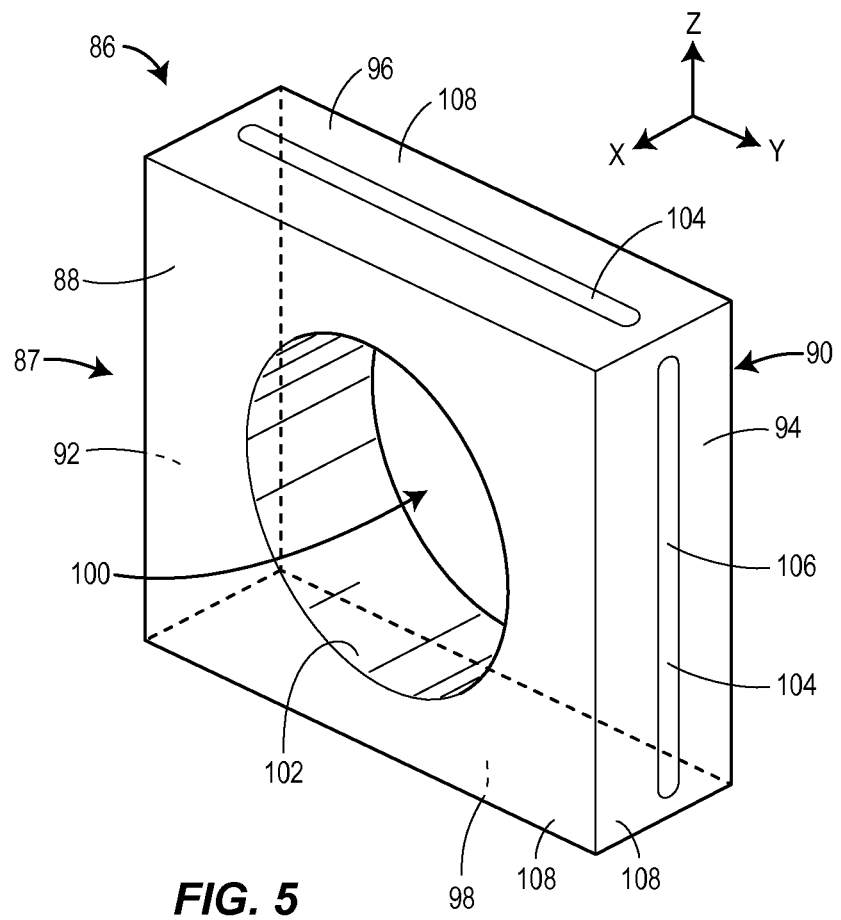
FIG. 5

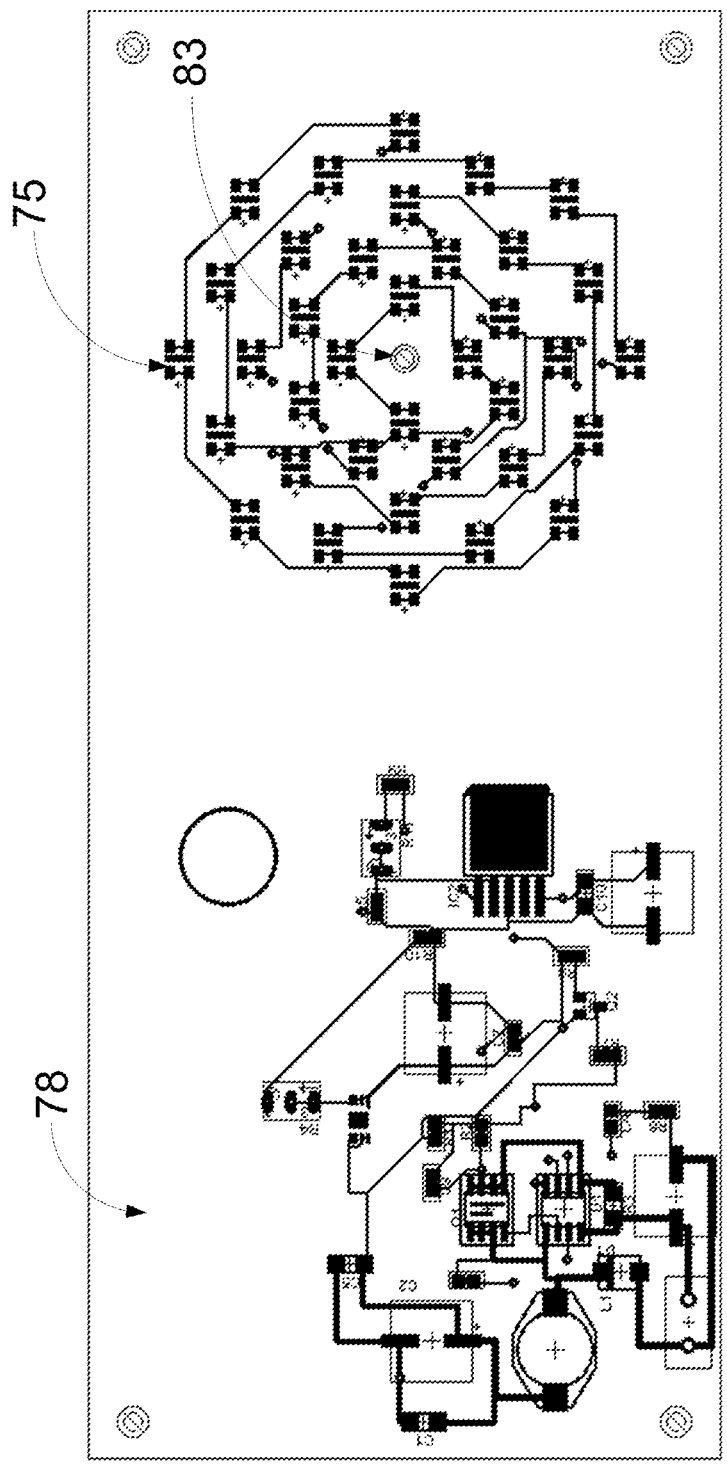

CAMERA TEST APPARATUS

FIELD OF THE DISCLOSURE

This disclosure relates generally to testing equipment, and more particularly, to testing equipment for cameras.

BACKGROUND

When evaluating video cameras, it is desirable to quantify the performance parameters including resolution, dynamic range, grey levels, distortion, sensitivity, operation frame rate, color fidelity, veiling glare, relative illumination, and bad pixel counts. There are some standards and proposals today regarding to the quantitative measurement of the video camera performance, but due to the difficulty to calibrate the test equipment, few video cameras on the market have certified performance and the end users can only select a product based on very limited and un-quantified information.

BRIEF SUMMARY OF THE DISCLOSURE

In one embodiment of the present disclosure, a camera testing apparatus includes a frame assembly, a control unit, and a plurality of first light sources coupled to the frame assembly and in communication with the control unit. Each of the plurality of first light sources is (or is adapted to be) in one of an illuminated first state or a non-illuminated second state, and each of the plurality of first light sources is adapted to be within a field of vision of a camera disposed remote from the plurality of first light sources. The camera testing apparatus also includes a plurality of second light sources coupled to the frame assembly and in communication with the control unit. Each of the plurality of second light sources is (or is adapted to be) in one of an illuminated first state or a non-illuminated second state, and each of the plurality of second light sources is adapted to be within the field of vision of the camera disposed remote from the plurality of second light sources. The control unit sends (or is adapted to send) a first command to each of the plurality of first light sources to change a first operational parameter of each of the plurality of first light sources, and the control unit sends (or is adapted to send) a second command to each of the plurality of second light sources to change a second operational parameter of each of the plurality of second light sources, and the first operational parameter is different than the second operational parameter. The first operational parameter of each of the plurality of first light sources changes (or is adapted to change) upon receiving the first command. The control unit sends (or is adapted to send) a second command to a first one of the plurality of second light sources to illuminate at a first brightness and a third command to a second one of the plurality of second light sources to illuminate at a second brightness that is different than the first brightness. The first one of the plurality of second light sources illuminates (or is adapted to illuminate) at the first brightness upon receiving the second command and the second one of the plurality of second light sources illuminates (or is adapted to illuminate) at the second brightness upon receiving the third command.

In another embodiment of the present disclosure, a method of testing a camera includes sending a first signal from a control unit to a first light source to change an operational parameter of the first light source from an illuminated first state to a non-illuminated second state. The first light source is coupled to a frame assembly disposed remote from the camera. The method further includes changing the state of the first light source from the illuminated first state to the non-illuminated second state. The method also includes activating a camera disposed remote from the frame assembly such that an image generated by the camera includes the first light source. The method also includes analyzing the image generated by the camera for a testing parameter.

In a further embodiment of the present disclosure, a camera testing apparatus includes a frame assembly, a control unit, and a plurality of first light sources coupled to the frame assembly and in communication with the control unit. Each of the plurality of first light sources is in one of an illuminated first state or a non-illuminated second state, and each of the plurality of first light sources is adapted to be within a field of vision of a camera disposed remote from the plurality of first light sources. The control unit sends (or is adapted to send) a command to each of the plurality of first light sources to change from the illuminated first state to the non-illuminated second state or from the non-illuminated second state to the illuminated first state, and each of the plurality of first light sources changes (or is adapted to change) from the illuminated first state to the non-illuminated second state or from the non-illuminated second state to the illuminated first state upon receiving the first command.

BRIEF DESCRIPTION OF THE DRAWINGS

FIG. 3A is a front view of an embodiment of a second light source of an embodiment of the camera testing apparatus;

FIG. 3B is a partial side view of the embodiment of the second light source of FIG. 3A;

FIG. 4C is a schematic diagram of an embodiment of a driver of an embodiment of the camera testing apparatus;

FIG. 5 is a perspective view of an embodiment of a veiling light apparatus of an embodiment of the camera testing apparatus;

DETAILED DESCRIPTION

Figure 1:
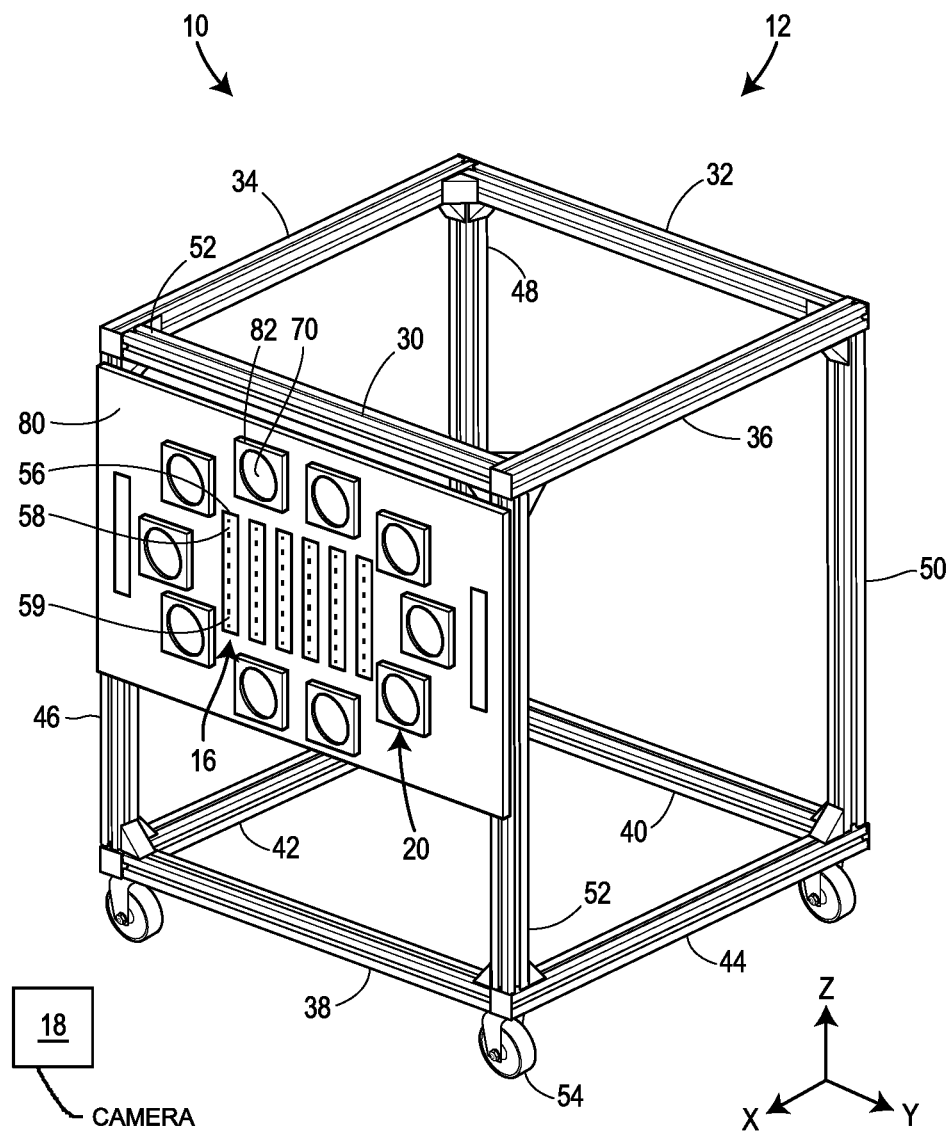
FIG. 1 is a perspective view of an embodiment of a camera testing apparatus.
Figure 2:
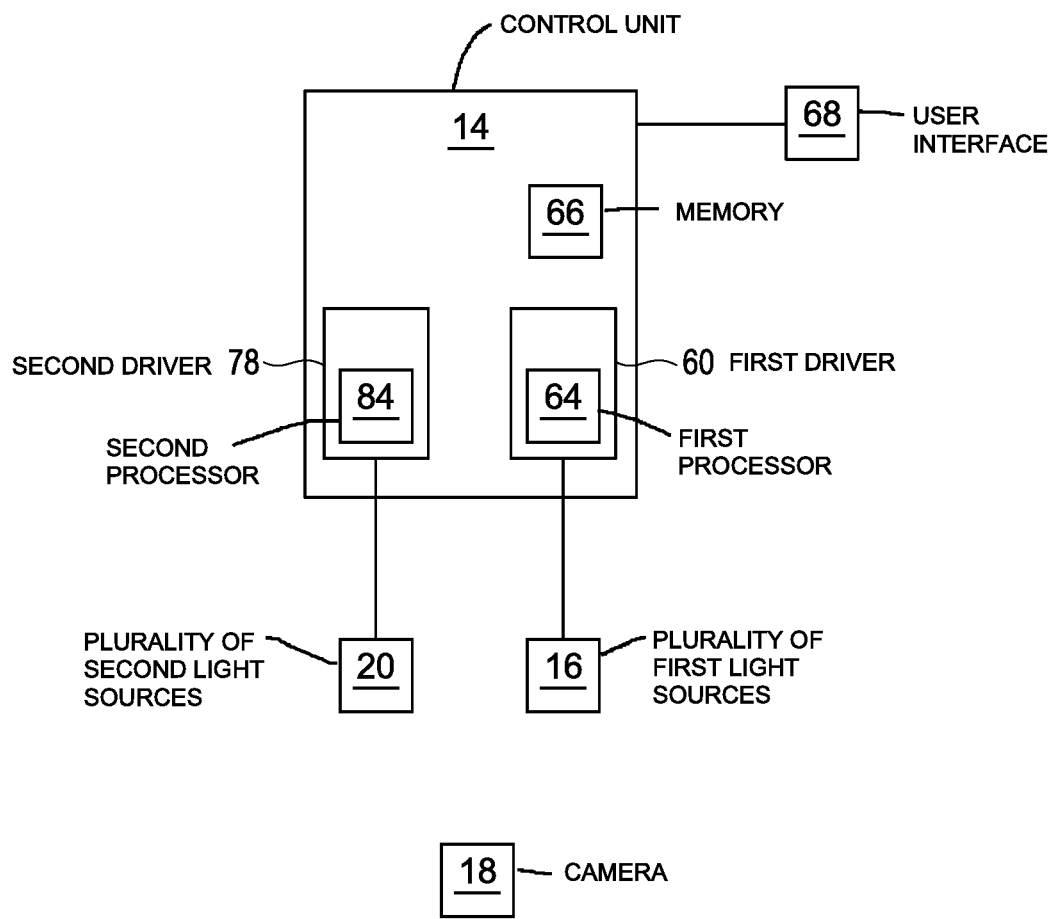
FIG. 2 is schematic representation of a control unit of an embodiment of the camera testing apparatus.

As illustrated in FIGS. 1 and 2, a camera testing apparatus 10 comprises a frame assembly 12, a control unit 14, and a plurality of first light sources 16 coupled to the frame assembly 12 and in communication with the control unit 14. Each of the plurality of first light sources 16 is in one of an illuminated first state or a non-illuminated second state, and each of the plurality of first light sources 16 is adapted to be within a field of vision of a camera 18 disposed remote from the plurality of first light sources 16. As illustrated in FIG. 1, the camera testing apparatus 10 also includes a plurality of second light sources 20 coupled to the frame assembly 12 and in communication with the control unit 14 (see FIG. 2). Each of the plurality of second light sources 20 is in one of an illuminated first state or a non-illuminated second state, and each of the plurality of second light sources 20 is adapted to be within the field of vision of the camera 18 disposed remote from the plurality of second light sources 20.

The control unit 14 sends a first command to each of the plurality of first light sources 16 to change a first operational parameter of any or all of the plurality of first light sources 16, and the first operational parameter of any or all of the plurality of first light sources 16 changes upon receiving the first command. The control unit 14 sends a second command to a first one of the plurality of second light sources 20 to illuminate at a first brightness and a third command to a second one of the plurality of second light sources 20 to illuminate at a second brightness that is different than the first brightness. The first one of the plurality of second light sources 20 illuminates at the first brightness upon receiving the second command and the second one of the plurality of second light sources 20 illuminates at the second brightness upon receiving the third command. So configured, the camera testing apparatus 10 provides a configurable and versatile platform to perform any of several tests that determine or verify camera performance characteristics, such as, for example, frame rate testing, veiling glare testing, and light sensitivity testing.

Turning to the camera testing apparatus 10 in more detail, FIG. 1 illustrates an embodiment of the frame assembly 12. The frame assembly 12 may include any number of frame elements and may have any suitable shape or combination of shapes. For example, as illustrated in FIG. 1, the frame assembly 12 may include a first upper frame member 30 that may be elongated and may have a longitudinal axis that extends in a first horizontal direction. As used herein, a horizontal direction is a direction extending along a plane parallel to or coplanar with the X-Y plane of the reference coordinate system provided in FIG. 1. More specifically, the longitudinal axis of the first upper frame member 30 may extend in a first horizontal direction that is parallel to or coaxial with the Y-axis of the reference coordinate system provided in FIG. 1. The frame assembly 12 may also include a second upper frame member 32, and the second upper frame member 32 may be elongated and may have a longitudinal axis that extends in the first horizontal direction. The longitudinal axis of the second upper frame member 32 may be parallel to and horizontally offset from the longitudinal axis of the first upper frame member 30.

The frame assembly 12 may also include a third upper frame member 34, and the third upper frame member 34 may be elongated and may have a longitudinal axis that extends in a second horizontal direction. More specifically, the longitudinal axis of the third upper frame member 34 may be parallel to or coaxial with the X-axis of the reference coordinate system provided in FIG. 1. The frame assembly 12 may further include a fourth upper frame member 36, and the fourth upper frame member 36 may be elongated and may have a longitudinal axis that extends in the second horizontal direction. The longitudinal axis of the fourth upper frame member 36 may be parallel to and horizontally offset from the longitudinal axis of the third upper frame member 34. The first, second, third, and fourth upper frame members 30, 32, 34, 36 may have the general shape of a square or rectangle when viewed along the Z-axis of the reference coordinate system provided in FIG. 1.

Still referring to FIG. 1, the frame assembly 12 may include a first lower frame member 38 that may be elongated and may have a longitudinal axis that extends in the first horizontal direction. More specifically, the longitudinal axis of the first lower frame member 38 may be parallel to and vertically offset from the longitudinal axis of the first upper frame member 30. The frame assembly 12 may include a second lower frame member 40 that may be elongated and may have a longitudinal axis that extends in the first horizontal direction. Specifically, the longitudinal axis of the second lower frame member 40 may be parallel to and horizontally offset from the longitudinal axis of the first lower frame member 38. In addition, the longitudinal axis of the second lower frame member 40 may be parallel to and vertically offset from the longitudinal axis of the second upper frame member 32.

The frame assembly 12 may include a third lower frame member 42 that may be elongated and may have a longitudinal axis that extends in the second horizontal direction. More specifically, the longitudinal axis of the third lower frame member 42 may be parallel to and vertically offset from the longitudinal axis of the third upper frame member 34. The frame assembly 12 may include a fourth lower frame member 44 that may be elongated and may have a longitudinal axis that extends in the second horizontal direction. Specifically, the longitudinal axis of the fourth lower frame member 44 may be parallel to and horizontally offset from the longitudinal axis of the third lower frame member 42. In addition, the longitudinal axis of the fourth lower frame member 44 may be parallel to and vertically offset from the longitudinal axis of the fourth upper frame member 36.

The first, second, third, and fourth lower frame members 38, 40, 42, 44 may have the general shape of a square or rectangle when viewed along the Z-axis of the reference coordinate system provided in FIG. 1. In addition, the longitudinal axis of the first, second, third, and fourth lower frame members 38, 40, 42, 44 may all extend along a single horizontal plane.

The frame assembly 12 may further include a first intermediate frame member 46 that may be elongated and may have a longitudinal axis that extends in a vertical direction. As used herein, a vertical direction is a direction along an axis parallel to or coaxial with the Z-axis of the reference coordinate system provided in FIG. 1. A first end of the first intermediate frame member 46 may extend from an intersection of the first upper frame member 30 and the third upper frame member 34. A second end of the first intermediate frame member 46 may extend from an intersection of the first lower frame member 38 and the third lower frame member 42.

The frame assembly 12 may also include a second intermediate frame member 48 that may be elongated and may have a longitudinal axis that extends in a vertical direction. A first end of the second intermediate frame member 48 may extend from an intersection of the second upper frame member 32 and the third upper frame member 34. A second end of the second intermediate frame member 48 may extend from an intersection of the second lower frame member 40 and the third lower frame member 42.

The frame assembly 12 may also include a third intermediate frame member 50 that may be elongated and may have a longitudinal axis that extends in a vertical direction. A first end of the third intermediate frame member 50 may extend from an intersection of the second upper frame member 32 and the fourth upper frame member 36. A second end of the third intermediate frame member 50 may extend from an intersection of the second lower frame member 40 and the fourth lower frame member 44.

The frame assembly 12 may additionally include a fourth intermediate frame member 52 that may be elongated and may have a longitudinal axis that extends in a vertical direction. A first end of the first intermediate frame member 46 may extend from an intersection of the first upper frame member 30 and the fourth upper frame member 36. A second end of the fourth intermediate frame member 52 may extend from an intersection of the first lower frame member 38 and the fourth lower frame member 44.

The frame members 30-52 may have any suitable length. For example, the first, second, third, and fourth upper frame members 30-36 may each have an identical length, such as such as 28 inches, for example. In addition, the first, second, third, and fourth lower frame members 38-44 may each have the same length as the first, second, third, and fourth upper frame members 30-36. The first, second, third, and fourth intermediate frame members 46-52 may each be longer than the first, second, third, and fourth upper frame members 30-36, and the first, second, third, and fourth intermediate frame members 46-52 may each be 48 inches, for example. The disclosed frame members may have any suitable shape. For example, each frame member 30-52 may include a tube having four longitudinal walls that are arranged to have a rectangular or square cross-sectional shape, and the four longitudinal walls may cooperate to define a hollow interior to reduce the weight of the frame members. The cross-sectional shape may be uniform along the entire longitudinal axis, or the cross-sectional shape may vary. A plurality of longitudinal ridges may be disposed on one of more of the four longitudinal walls to stiffen the frame members. The frame members may be made from any suitable material, such as a non-combustible material (e.g., aluminum or plastic). The frame assembly 12 may also include a plurality of casters 54 that allow a user to easily move the heat-generating apparatus 10 to a desired location.

As illustrated in FIG. 1, the camera testing apparatus 10 also includes the plurality of first light sources 16 coupled to the frame assembly 12 and in communication with the control unit 14 (see FIG. 2). Each of the plurality of first light sources 16 is adapted to be within a field of vision of a camera 18 disposed remote from the plurality of first light sources 16. Each of the plurality of first light sources 16 may be any suitable light source. For example, each of the plurality of first light sources 16 may be a bar light source 56 including two or more point sources of light 58 disposed along or substantially along a linear axis. Each linear axis may be disposed in any suitable orientation. For example, each linear axis may be vertical (i.e., parallel to or coaxial with the Z-axis of the reference coordinate system provided in FIG. 1). Any number of first light sources 16 (e.g., bar light sources 56) may be used, such as three to seven first light sources 16. For example, five first light sources 16 may be used. Each of the bar light sources 56 may be disposed within or adjacent to a vertical plane. Each of the two or more point sources of light 58 (either in connection with the bar light sources 56 or two or more point sources of light 58 that comprise one of the plurality of first light sources 16) may be any suitable light source that generates an intense light over a relatively small area and can be controlled by the control unit 14. For example, each of the two or more point sources of light 58 may be an LED 59 in communication with the control unit 14. More specifically, each (or any) of the two or more point sources of light 58 may be an LED in communication with a first driver 60 that is itself in communication with or is a component of the control unit 14. Each bar light source 56 may be a rectangular bar and each of two or more point sources of light 58 may be coupled to the bar light source 56, and each of two or more point sources of light 58 may be vertically-aligned.

As illustrated in FIG. 1, the plurality of first light sources 16 may be directly or indirectly secured to the frame assembly 12. For example, the plurality of first light sources 16 may be coupled to a panel member 80 that may be directly or indirectly secured to the frame assembly 12. The panel member 80 may be coupled to any suitable location of the frame assembly 12 and may be disposed in any suitable orientation. For example, the panel member 80 may be planar and disposed in a plane parallel to the Y-Z plane of the reference coordinate system of FIG. 1. The panel member 80 may be coupled to any or all of (or portions of) the first upper frame member 30, the fourth intermediate frame member 52, and the first intermediate frame member 46. For example, each of the bar light sources 56 including two or more point sources of light 58 may be coupled to the panel member 80 and may be disposed parallel to a linear vertical axis (i.e., the Z-axis of the reference coordinate system of FIG. 1). Instead of, or in addition to, the panel member 80, a plurality of elongated support members 81 (see FIG. 6B) may be disposed between all or a portion of the first upper frame member 30 and the first lower frame member 38 and/or between all or a portion of the first intermediate frame member 46 and the fourth intermediate frame member 52. For example, each of the plurality of support members 81 may extend parallel to the Z-axis of the reference coordinate system of FIG. 1. Each of the bar light sources 56 may be secured to at least one of the plurality of support members 81. As illustrated in FIG. 1, each of the bar light sources 56 may have a top portion that is horizontally-aligned (i.e., aligned along the Z-axis of the reference coordinate system of FIG. 1) and a bottom portion that is horizontally-aligned. Each (or groups) of the bar light sources 56 may be offset a uniform distance or may be spaced in any suitable manner.

Each of the plurality of first light sources 16 (e.g., the point sources of light 58) is in one of an illuminated first state or a non-illuminated second state. In the illuminated first state, any of the plurality of first light sources 16 may have any suitable intensity. For example, the intensity of a first one of the plurality of first light sources 16 may be different than the intensity of a second one of the plurality of first light sources 16. Alternatively, all of the plurality of first light sources 16 may have a uniform or substantially uniform intensity. Each of the plurality of first light sources 16 is adapted to be within a field of vision of the camera 18 disposed remote from the plurality of first light sources 16.

As illustrated in FIG. 2, the control unit 14 may include a first processor 64 that may send a first command to each (or any) of the plurality of first light sources 16 to change a first operational parameter of each of the plurality of first light sources 16, and the first operational parameter of each (or any) of the plurality of first light sources 16 changes upon receiving the first command. For example, the first operational parameter may be the state of illumination of each (or any or all) of the plurality of first light sources 16 (i.e., whether any or all of the plurality of first light sources 16 are the illuminated first state to the non-illuminated second state). Accordingly, the command to change the first operational parameter may be that each (or any) of the plurality of first light sources 16 are to change from the illuminated first state to the non-illuminated second state (or vice versa). More specifically, the command to change the first operational parameter may be that each (or any) of the plurality of first light sources 16 are to change from the illuminated first state to the non-illuminated second state (or vice versa). Alternatively, the command to change the first operational parameter may be that each (or any) of the two or more point sources of light 58 of a first bar light source 56*a* (or multiple bar light sources) are to change from the illuminated first state to the non-illuminated second state (or vice versa).

In other embodiments, the command to change the first operational parameter may be that each (or any) of the plurality of first light sources 16 are to change from a first output intensity (i.e., a first brightness) to a second output intensity (i.e., a second brightness) that is different than the first output intensity (or vice versa). More specifically, the command to change the first operational parameter may be that each (or any) of the plurality of first light sources 16 are to change from the first output intensity to the second output intensity (or vice versa). Alternatively, the command to change the first operational parameter may be that each (or any) of the two or more point sources of light 58 of a first bar light source 56*a* (or multiple bar light sources) are to change from the first output intensity to the second output intensity (or vice versa).

Configured as described, each or any of the plurality of first light sources 16 may be used to perform a frame rate test or an exposure time test. Specifically, a camera 18 to be tested may be disposed remote from the plurality of first light sources 16, and any or all of the plurality of first light sources 16 may be within the field of vision of the camera 18. In some embodiments, the plurality of first light sources 16 may occupy approximately 80% of the space of an image taken with the camera 18. With the camera 18 so positioned, the command to change the operational parameter (e.g., being in the illuminated first state or the non-illuminated second state, or vice versa) may be issued or triggered a known number of times over a given time period (i.e., at a known frequency). Images may be taken by the camera 18 of the plurality of first light sources 16, and the images are analyzed to determine if a consecutive succession of images show all of the plurality of first light sources 16 in only one of the illuminated first state or the non-illuminated second state. If so, then the known frequency of the changing of the operational parameter is the same as the frame rate (or exposure time) of the camera 18. Said another way, if the camera 18 captures a steady-state image of the plurality of first light sources 16 constantly in the illuminated state, then the frame rate (or exposure time) of the camera is equal to the frequency of the changing of the plurality of first light sources 16 from off to on. However, the images may be analyzed and it may be determined that in a consecutive succession of images, all of the plurality of first light sources 16 are not in only one of the illuminated first state or the non-illuminated second state. If so, then the known frequency of the changing of the operational parameter is not the same as the frame rate of the camera 18. The frequency is then adjusted (by a user of automatically by the control unit 14) until a consecutive succession of images show all of the plurality of first light sources 16 in only one of the illuminated first state or the non-illuminated second state.

Referring to FIG. 2, the first command may be generated by a program that is saved to a memory 66 of the control unit 14. Alternatively, the first command may be generated by a user input via a user interface 68 in communication with the control unit 14. The control unit 14 may include a power source (not shown) or a power source may be electrically coupled to one or more components of the control unit 14 and/or to the first driver 60 to provide power to the plurality of first light sources 16.

The first driver 60 (or any portion of the control unit 14 in communication with the first processor 64) may include a timing circuit that may shift the phase of a first one (or more) of the plurality of first light sources 16 relative to the phase of a second one (or more) of the plurality of first light sources 16 at a given frequency. More specifically, a first group of the plurality of first light sources 16 (e.g., two or more bar light sources 56) may illuminate and stop illuminating (i.e., power on and off) at a first constant frequency at a first phase, and a second group of the plurality of first light sources 16 (e.g., two or more bar light sources 56) may illuminate and stop illuminating at the first constant frequency at a second phase that is different than the first phase. The second group of the plurality of first light sources 16 may illuminate and stop illuminating at a second frequency that is lower than the first frequency. By reducing the frequency, images that are taken or recorded to average out noise are not mistaken for sequential images that are recorded to memory, thereby allowing testing adjustments to be made to maintain testing consistency. For example, in the case when the second frequency is a half of the first frequency, all video frames or images captured by a camera implementing two frame averaging will show images of the first group of the first light source and the second group of the first light source. While the video frames captured by a camera without averaging will only show images of both group of the first light source every other frame. Similarly, this method can detect three frame averaging, four frame averaging and five frame averaging by setting the second frequency to ⅓, ¼, and ⅕, respectively, of the first frequency.

As illustrated in FIG. 1, the camera testing apparatus 10 also includes the plurality of second light sources 20 coupled to the frame assembly 12 and in communication with the control unit 14. Referring to FIG. 2, the plurality of second light sources 20 may be in communication with the first processor 64 of the control unit 14 or with a second processor 84 of the control unit. Each of the plurality of second light sources 20 is adapted to be within a field of vision of a camera 18 disposed remote from the plurality of second light sources 20. Each of the plurality of second light sources 20 may be any suitable light source that may be different or may have different characteristics than the plurality of first light sources 16. For example, as illustrated in FIG. 1, each of the plurality of second light sources 20 may include an illuminated area 70 that uniformly illuminates. The illuminated area 70 may have any suitable shape or size so as to be capable of being visible or perceptible to the camera 18.

Figure 4A:
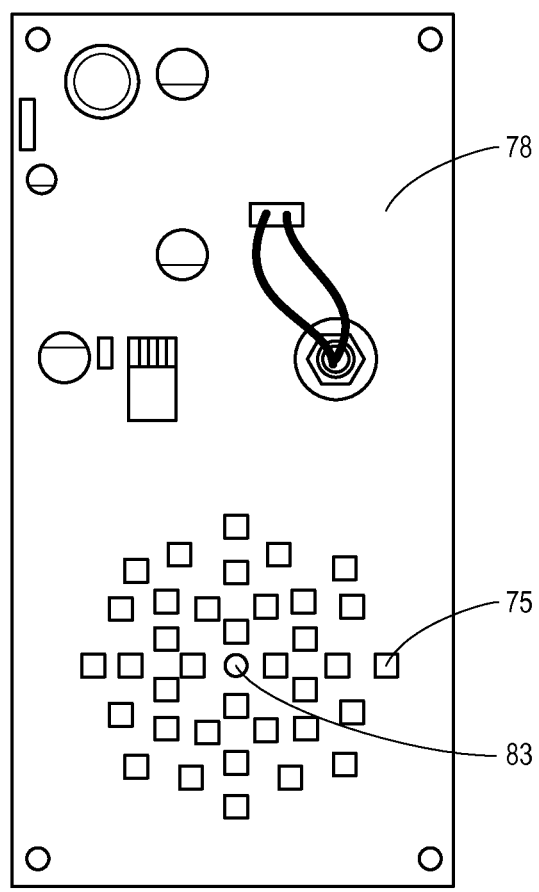
FIG. 4A is a front view of an embodiment of a driver of an embodiment of the camera testing apparatus.
Figure 4B:
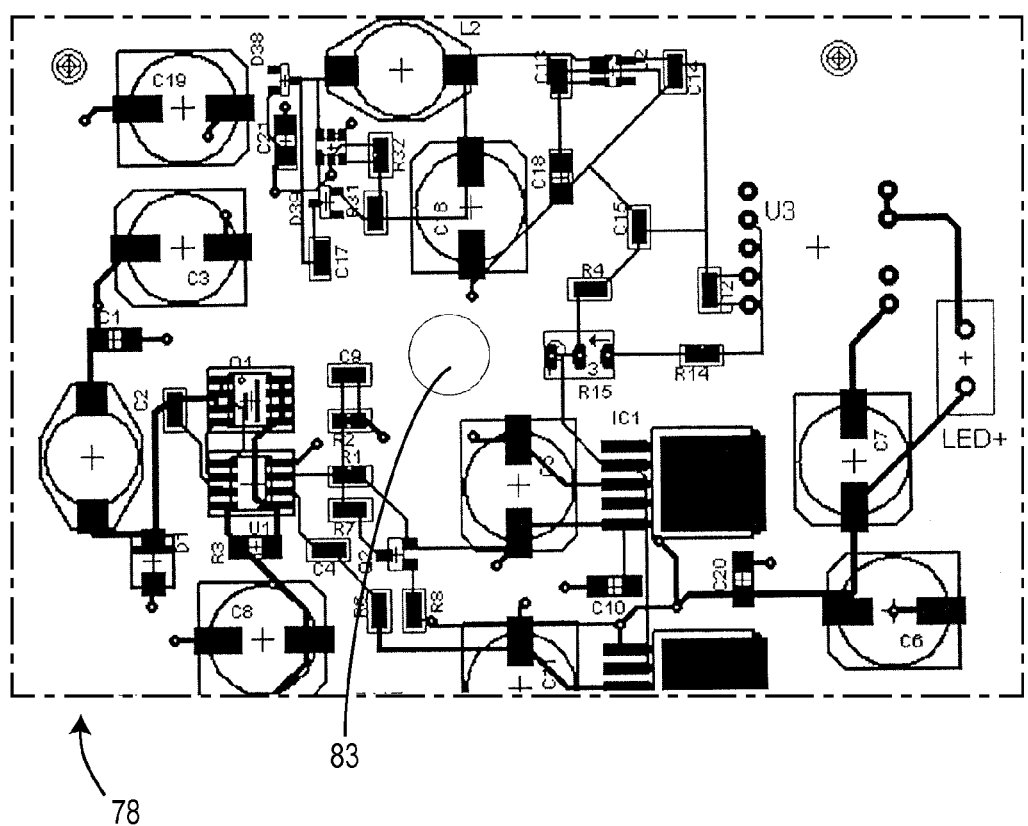
FIG. 4B is a schematic diagram of an embodiment of a driver of an embodiment of the camera testing apparatus.
Figure 4D:
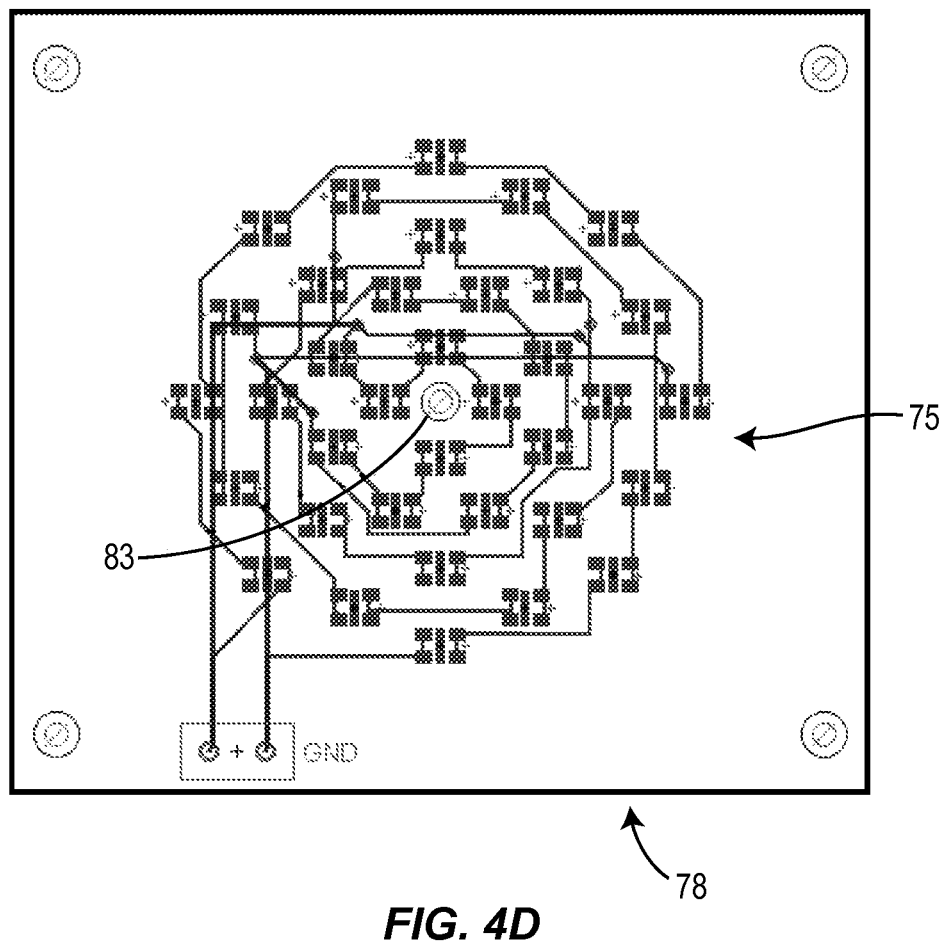
FIG. 4D is a schematic diagram of an embodiment of a driver of an embodiment of the camera testing apparatus.

The second light sources 20 may have any suitable structure to provide the illuminated area 70. For example, as illustrated in FIGS. 3A and 3B, each of the second light sources 20 may include a hollow light tube 72 that extends from an open first end 74*a* to an open second end 74*b*. The light tube 72 may have any suitable shape, such as that of a cylinder or oval, for example. A diffuser element 76 may be disposed at the first end 74*a* of the light tube 72. The diffuser element 76 may be planar and may cover the entire open first end 74*a* of the light tube 72. The diffuser element 76 may be transparent or translucent, and may be made of any suitable material, such as glass or polycarbonate. The diffuser element 76 may also have any suitable color, such as white. The open second end 74b of the light tube 72 may be disposed at or adjacent to one or more light sources 75. For example, the open second end 74b of the light tube 72 may be disposed adjacent to one or more LEDs, such as one or more OLEDs (i.e., organic light emitting diodes). More specifically, a plurality of OLEDs may be arrayed at or adjacent to the open second end 74b of the light tube 72 such that the second end 74b surrounds the plurality of OLEDs. As illustrated in FIG. 4A, the plurality of OLEDs may be arrayed on a circuit board that may be a component of a second driver 78 that may be a part of or may be in communication with the control unit 14. Other embodiments of a circuit board that may be a component of a second driver 78 is illustrated in FIGS. 4B, 4C, and 4D. Alternatively, the plurality of OLEDs may be arrayed on a circuit board that may be a circuit board of the first driver 60 (see FIG. 2) or any other driver. The array of LEDs or OLEDs may have a circular perimeter or any suitable perimeter that corresponds to the shape of the second end 74b of the light tube 72. Each of the second light sources 20 may have its own second driver 78 or two or more of the second light sources 20 may share one second driver 78.

Figure 8B:
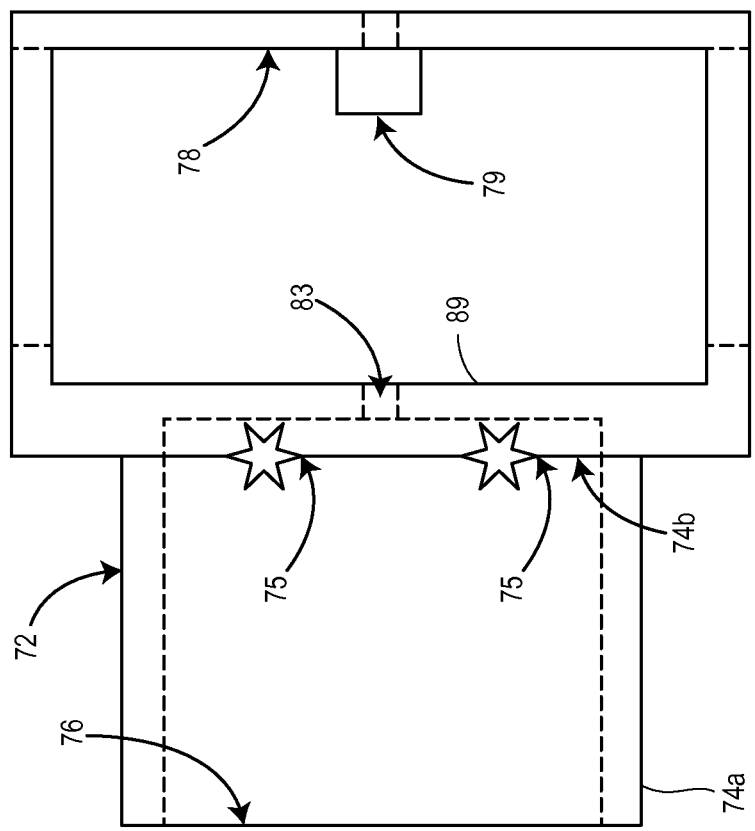
FIG. 8B is a partial side view of the embodiment of the second light source of FIG. 3A.
Figure 8A:
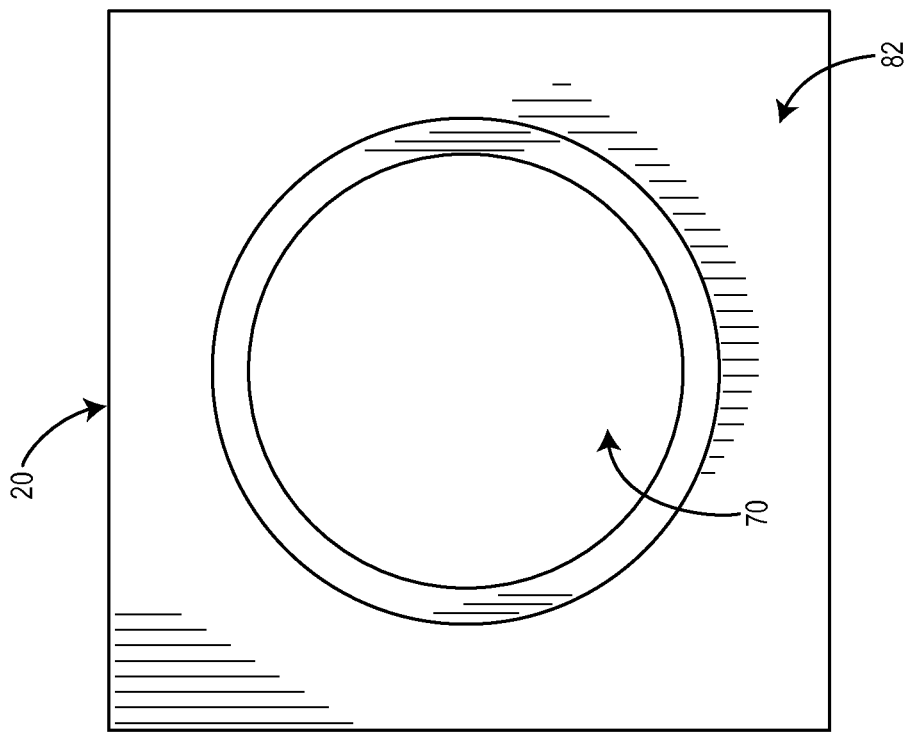
FIG. 8A is a front view of an embodiment of a second light source of an embodiment of the camera testing apparatus.

As illustrated in FIGS. 4A to 4D, the circuit board of the second driver 78 may have an aperture 83 therethrough, and the aperture 83 may be surrounded by the array of LEDs or OLEDs. FIGS. 8A and 8B illustrate an alternative embodiment of one or more of the second light sources 20 having a aperture 83 through a surface 89 that is offset from the second driver 78 or a surface of the second driver 78. An optical sensor 79 (see, for example, FIG. 8B) may be disposed on the circuit board (on a side opposite that of the array of LEDs or OLEDs) to sense light from the array of LEDs or OLEDs that passes through the aperture 83 to determine the temperature of the LEDs or OLEDs. The optical sensor may be in communication with the control unit 14 (such as the first processor 64 or the second processor 84 in communication with the plurality of second light sources 20) to communicate the temperature of the LEDs or OLEDs. If the temperature is higher than a threshold temperature, a command or alert may be issued. The command may be a command to power down the LEDs or OLEDs to prevent damage to the components of the second driver 78. Instead of (or in addition to) the optical sensor, a Hall effect sensor may be disposed on the circuit board to sense the temperature of the array of LEDs or OLEDs. The Hall effect sensor may be in communication with the control unit 14 (such as the first processor 64 or the second processor 84) to communicate the temperature of the LEDs or OLEDs. The Hall effect sensor may replace a current sensing resistor, which reduces the heat dissipation and improves circuit stability. If the temperature is higher than a threshold temperature, a command or alert may be issued. The command may be a command to power down the LEDs or OLEDs to prevent damage to the components of the second driver 78. FIG. 4B illustrates a circuit diagram of an embodiment of the second driver 78.

When the second driver 78 generates or receives a command to illuminate any or all of the one or more light sources 75, any or all of the one or more light sources 75 are illuminated to provide light within the light tube 72, and this light illuminates the illuminated area 70 such that the illuminated area 70 is uniformly illuminated or substantially uniformly illuminated.

As illustrated in FIG. 1, the plurality of second light sources 20 (e.g., the light tube 72, the one or more light sources 75, the diffuser element 76, and the second driver 78 as illustrated in FIG. 3B) may be directly or indirectly secured to the frame assembly 12. For example, the plurality of second light sources 20 may be coupled to the panel member 80 that may be directly or indirectly secured to the frame assembly 12. The panel member 80 may have a aperture corresponding to each of the plurality of second light sources 20 such that the first end 74a (see FIG. 3B) is disposed through or adjacent to the aperture of the of the panel member 80. As such, the illuminated area 70 is visible when the viewed along or parallel to the X-axis of the reference coordinate system of FIG. 1. All or part of the diffuser element 76 (i.e., the illuminated area 70) may be disposed coplanar with (or slightly offset from) an outer surface of the panel member 80. As illustrated in FIG. 3B, a retainer plate 82 may be secured to the panel member 80 to retain and secure the diffuser element 76 (and the light tube 72) such that the diffuser element 76 the illuminated area 70 is disposed within or adjacent to an aperture in the retainer plate 82. The illuminated area 70 (and the aperture in the retainer plate 82) may be circular and may have a diameter between 0.5" and 6".

A first one of the plurality of second light sources 20 may be adapted to provide a first brightness and a second one of the plurality of second light sources 20 may be adapted to provide a second brightness that is different than the first brightness. In addition, a third one of the plurality of second light sources 20 may be adapted to provide a third brightness that is different than the first brightness and the second brightness (and so on).

As illustrated in FIG. 2, the control unit 14 (e.g., the second processor 84) may send a second command to the first one of the plurality of second light sources 20 to illuminate at the first brightness (i.e., intensity) and a third command to the second one of the plurality of second light sources to illuminate at a second brightness. In some embodiments, the second command and the third command may be the same command. In other embodiments, the second command and the third command may be different commands. In other embodiments, the control unit 14 may send a fourth command to a third one of the plurality of second light sources 20 to illuminate at a third brightness that is different that the first brightness and the second brightness. In some embodiments, the fourth command may be the same as the second command and the third command. In other embodiments, the third command may be different than one or both of the second command and the third command. The second command, third command, and/or fourth command may be any suitable signal that result in the first brightness, second brightness, and/or third brightness, respectively. For example, the second command, third command, and/or fourth command may be a command from a power source (not shown) that is part of the control unit 14 to illuminate the first, second, and/or third one of the plurality of second light sources 20. Alternatively, the second command, third command, and/or fourth command may be generated by a program that is saved to a memory (e.g., the memory 66) of the control unit 14.

The brightness of each of the plurality of second light sources 20 may be fixed and unadjustable or the brightness of each of the plurality of second light sources 20 may be variable and/or adjustable. The brightness of each of the plurality of second light sources 20 may be adjusted by a user or by a program that is saved to a memory 66 (see FIG. 2) of the control unit 14. In some embodiments, the brightness of each of the plurality of second light sources 20 may be adjusted by a program that is saved to a memory of the second driver 78.

The plurality of second light sources 20 may be disposed in any suitable manner to allow the plurality of second light sources 20 to be within the field of vision of the camera 18 disposed remote from the plurality of second light sources 20. For example, as illustrated in FIG. 1, the plurality of second light sources 20 may be disposed in a circular pattern surrounding any or all of the plurality of first light sources 16. In some embodiments, the plurality of second light sources 20 may be disposed in a circular pattern surrounding two or more bar light sources 56. In some embodiments, twelve second light sources 20 may be arrayed in a circular pattern forming a circular perimeter, and five bar light sources 56 may be disposed within or inside the circular perimeter. In some embodiments, the plurality of second light sources 20 may be disposed in a circular pattern and no first light sources 16 are disposed within or inside the circular perimeter. The plurality of second light sources 20 may be disposed in an "X" pattern, or may be disposed in two or more rows or columns.

Configured as described, each of the plurality of second light sources 20 may provide a unique brightness that may vary from a minimum brightness (or intensity) to a maximum brightness (or intensity). Accordingly, when the camera 18 disposed remote from the plurality of second light sources 20 takes an image of the plurality of second light sources 20, a light sensitivity test may be performed on the camera 18. In the light sensitivity test, the light sensitivity of the camera 18 can be determined relative to another camera by analyzing images from each camera. That is, the intensity of each of the plurality of second light sources 20 is known, so if a given one of the plurality of second light sources 20 is resolved in the image taken by the camera 18, the camera 18 light sensitivity is at least equal to the intensity of the given one of the plurality of second light sources 20. However, if the image taken by the camera 18 does not show another one of the plurality of second light sources 20, the camera 18 light sensitivity is greater than the intensity of the another one of the plurality of second light sources 20. Accordingly, multiple cameras can be tested to determine or verify light sensitivity values.

The driver (e.g., the first driver 60 and/or second driver 78) may be any suitable electrical device that regulates the power of one or more LEDs to maintain or provide a desirable power level (e.g., constant power) as the electrical properties of the one or more LEDs 59 changes due to corresponding changes in temperature. For example, a driver 60 may include a plurality of connections (not shown) adapted to electrically couple the one or more LEDs 59 to the driver 60. Instead of a driver, a conventional power supply can be used to power any of the one or more LEDs.

Figure 7:
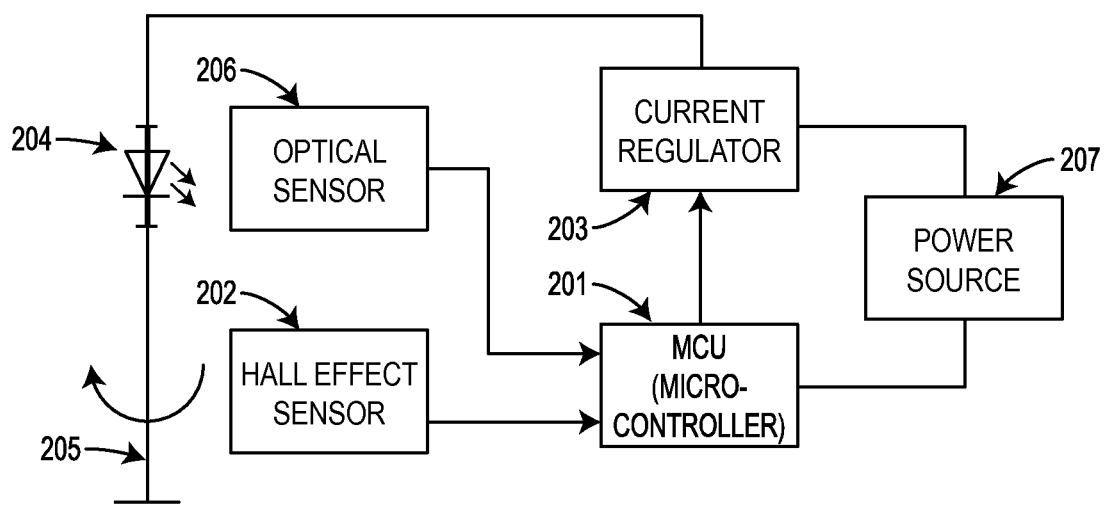
FIG. 7 is a schematic diagram of an embodiment of a driver of an embodiment of the camera testing apparatus.

FIG. 7 illustrates a block diagram of an embodiment of the second driver 78. The second driver 78 may include one or more LEDs, 204, an optical sensor 206, and/or a Hall effect sensor 202. The optical sensor 206 may measures the variation of the LED 204 output (i.e., senses a stability of the LED 204 or an array of the LEDs). The Hall effect sensor 202 may monitor a magnetic field intensity associated with a current draw of an LED 204 or an array of LEDs. For example, the Hall effect sensor 202 may measure a magnetic field around a wire 205 in communication with the LED 204 (or an array of LEDs), and the magnetic field is associated with a current draw of the LED (or an array of LEDs). The second driver 78 may also include a microcontroller 201 (MCU) that adjusts a current regulator 203 according to output signals from the optical sensor 206 and/or the Hall effect sensor 202. The current regulator 203 may control the stability of the LED 204 (or the array of LEDs). The microcontroller 201 and the current regulator 203 may each be coupled to a power source 207. The current regulator 203 may control the stability of an array of LEDs disposed on the second driver 78.

The camera testing apparatus 10 may also include a veiling light apparatus 86, as illustrated in FIG. 5. The veiling light apparatus 86 may include a body 87, and the body 87 may be a solid block of material having a rectangular cross-section. The body 87 may be made from a solid and unitary block of clear or translucent plastic material, such as clear acrylic. The body 87 may include a planar front surface 88 that is parallel to the Y-Z plane of the reference coordinate system of FIG. 5. A planar rear surface 90 is parallel to and offset from the front surface in a direction parallel to the X-axis of the reference coordinate system of FIG. 5. A lateral first side surface 92 extends between the front surface 88 and the rear surface 90 in a direction normal to the front surface 88. That is, the first side surface 92 is parallel to the X-Z plane of the reference coordinate system of FIG. 5. A lateral second side surface 94 also extends between the front surface 88 and the rear surface 90 in a direction normal to the front surface 88, and the second side surface 94 is offset from the first side surface 92 in a direction parallel to the Y-axis of the reference coordinate system of FIG. 5. A top surface 96 extends between the front surface 88 and the rear surface 90 in a direction normal to the front surface 88, and the top surface 96 in normal to the front surface 88, the first side surface 92, and the second side surface 94. That is, the top surface 96 is parallel to the X-Y plane of the reference coordinate system of FIG. 5. A bottom surface 98 also extends between the front surface 88 and the rear surface 90, and the bottom surface 98 is offset from the top surface 98 in a direction parallel to the Z-axis of the reference coordinate system of FIG. 5. A central aperture 100 (defined by one or more aperture walls 102) may extend through the veiling light apparatus 86 from the front surface 88 to the rear surface 90, and the central aperture 100 may extend in a direction parallel to the X-axis of the reference coordinate system of FIG. 5. The central aperture 100 and the may have any suitable shape, such as a circular shape, and the central aperture 100 may have a cylindrical shape (i.e., the aperture wall has the shape of a cylinder). One or more elongated grooves 104 may be disposed along the length of any or all of the first side surface 92, the second side surface 94, the top surface 96, and/or the bottom surface 98. Each of the one or more elongated grooves 104 may have a length within a range of 100% to 75% of the length of any or each of the first side surface 92, the second side surface 94, the top surface 96, and/or the bottom surface 98.

The veiling light apparatus 86 may additionally include one or more light sources 106 disposed in or adjacent to each of the elongated grooves 104. For example, each of the one or more light sources 106 may be a plurality of LEDs positioned and adapted to inwardly illuminate the body 87 through any of one or more surfaces defining each groove 104. The light sources 106 may be in communication with the control unit 14 or may be independently controllable by the user. The one or more light sources 106 may each provide a constant illumination intensity when illuminated. Alternatively, the one or more light sources 106 may each provide an adjustable illumination intensity when illuminated.

The veiling light apparatus 86 may also include one or more mask elements 108 having a reflective inside surface to reflect light within the body 87. An outside surface of the mask elements may be black. For example, a first and second one of the one or more mask elements 108 may be adapted to cover all or a portion of each of the front surface 88 and the rear surface 90. The reflective inside surface of the mask element 108 on the front surface 88 faces the rear surface 90 and the reflective inside surface of the mask element 108 on the rear surface 90 faces the front surface 88. A third through sixth one of the mask elements 108 may be adapted to cover all or a portion of each of the first side surface 92, the second side surface 94, the top surface 96, and/or the bottom surface 98. The reflective inside surface of the mask element 108 may face the center aperture 100. The aperture wall(s) 102 and all or part the surfaces that define each of the elongated grooves 104 may not be covered by a corresponding one of the mask elements 108. Any or all of the mask elements 108 may include one or more coats of paint or other surface treatment. In addition, any or all of the mask elements 108 may be a separate component that is secured to the body 87. In operation, the plurality of light sources 106 may be illuminated, and due to the internal reflective surfaces of the mask elements 108, the illumination is directed through the one or more aperture walls 102 to provide a uniform, circumferential light within and/or adjacent to the central aperture 100.

So configured, the veiling light apparatus 86 may be use to perform a veiling glare test one or more cameras 18. More specifically, a first camera 18 may be placed in or adjacent to the central aperture 100. For example, a lens of the first camera 18 may be aligned with a central axis of the central aperture 100 such that the lens is disposed between a vertical plane of the front surface 88 and a vertical plane of the rear surface 90. When an image is taken using the first camera 18, the image may be analyzed to determine the extent or degree of veiling glare. In addition, or alternatively, the image can be compared with images taken from a second camera to compare the extent or degree of veiling glare. The veiling light apparatus 86 may be coupled to the frame assembly 12 or may be disposed remote from the frame assembly 12. In some embodiments, the veiling light apparatus 86 may be used independently from the frame assembly 12. In some embodiments, the veiling glare test may be performed during or in conjunction with any or all other tests. For example, the veiling light apparatus 86 may be used as described during the performance of the frame rate test and/or the sensitivity tests.

Figure 6A:
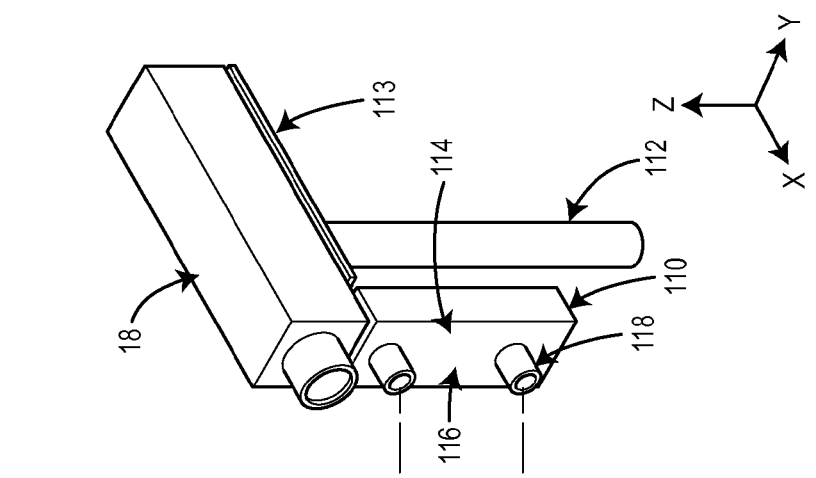
FIG. 6A is a perspective view of an embodiment of a camera support of an embodiment of the camera testing apparatus.
Figure 6B:
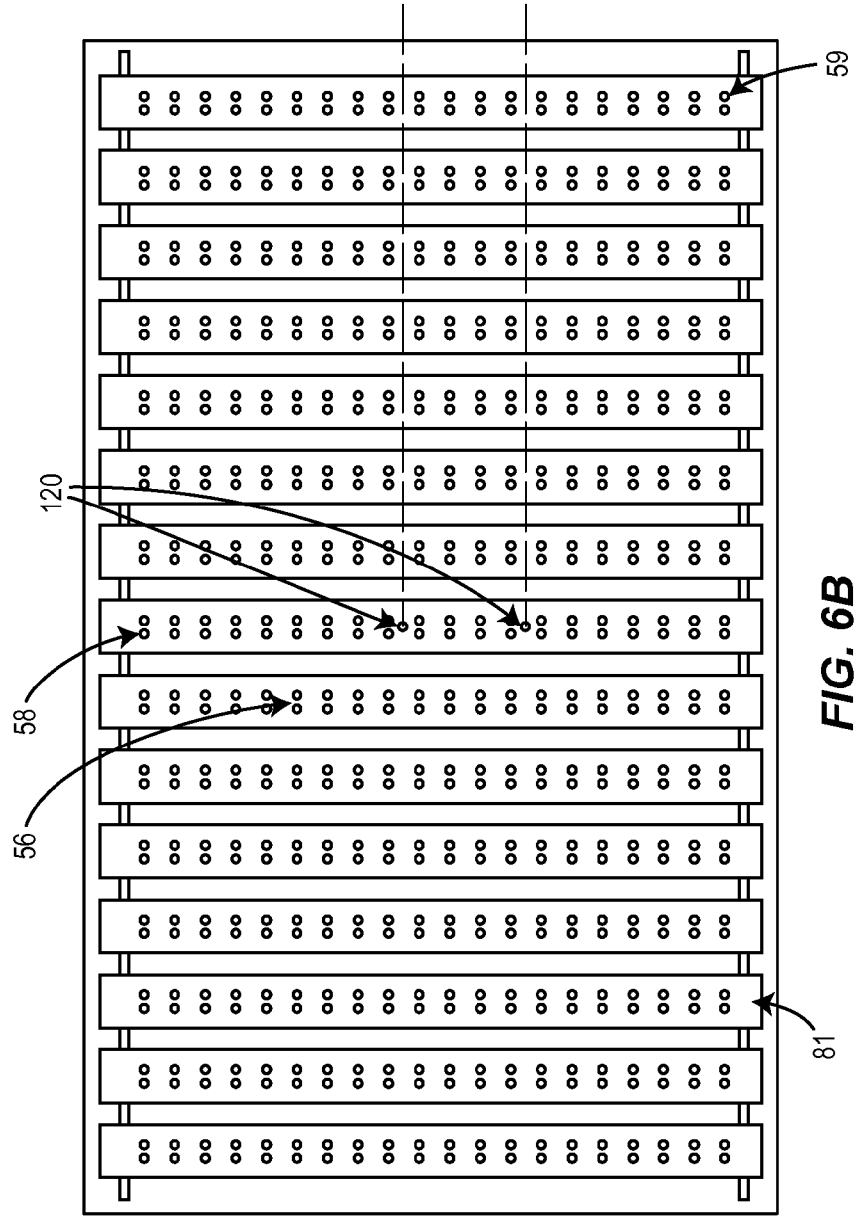
FIG. 6B is a front view of the frame assembly showing an embodiment of the second alignment features of the camera support of FIG. 6A.

The camera testing apparatus 10 may also include an alignment fixture 110 that is adapted to be coupled to a camera support 112 that is itself adapted to support the camera 18, as illustrated in FIG. 6A. The camera support 112 (and or the alignment fixture 110) may be secured or coupled to the frame assembly 12 or may be disposed remote from the frame assembly 12. In some embodiments, the camera support 112 (and or the alignment fixture 110) may be used independently from the frame assembly 12. The camera support 112 may have any structure adapted to steadily support a camera while any of the above-described tests are performed and/or while the camera 18 is used to record or take one or more images. The camera support 112 may have any suitable mounting mechanism 113 adapted to coupled the camera to the camera support 112. For example, the camera support 112 may be a conventional tripod having a conventional mounting mechanism. The alignment fixture 110 may be a bracket 114 having an alignment portion 116 that is fixed to the camera support 112. The alignment portion 116 may be fixed to the mounting mechanism 113 of the camera support 112. The alignment portion 116 may be planar and may be vertical or substantially vertical (i.e., aligned with the Z-axis of the reference coordinate system of FIG. 1).

The alignment portion 116 may support or one or more first alignment features 118 that may be used in conjunction with one or more corresponding second alignment features 120 (see FIG. 6B) disposed on or adjacent to any of the frame assembly 12, the plurality of first light sources 16, and the plurality of second light sources 20. The one or more first alignment features 118 may cooperate with the one or more second alignment features 120 to ensure the camera 18 supported by the camera support 112 is in a correct position to perform any or all of the previously-described tests. For example, the one or more first alignment features 118 may include one or more lasers and the one or more second alignment features 120 may be one or more corresponding apertures or markings on the frame assembly 12 or the panel member 80 (or any of the plurality of first or second light sources 16, 20). In some embodiments, the one or more second alignment features 120 may include one or more lasers and the one or more first alignment features 118 may be one or more corresponding apertures or markings on the frame assembly 12 or the panel member 80 (or any of the plurality of first or second light sources 16, 20). The first alignment features 118 may include two lasers that are vertically separated and aligned along a vertical axis and the second alignment features 120 may include two corresponding apertures or markings on the frame assembly 12 or the panel member 80 (or any of the plurality of first or second light sources 16, 20). In this embodiment, the beams from each laser may pass through the corresponding aperture or may be disposed on or adjacent to the markings.

Configured as described, the embodiments of the camera testing apparatus 10 and the methods of using the embodiments of the camera testing apparatus 10 are capable of quantitatively, consistently and accurately measuring the performance of video cameras and providing meaningful information for the end users to choose a suitable product. One having ordinary skill in the art would recognize that the disclosed embodiments of the camera testing apparatus 10 can be easily calibrated with off-the-shelf optical equipment and that can accurately quantify the performance for various kinds of video cameras.

While various embodiments have been described above, this disclosure is not intended to be limited thereto. Variations can be made to the disclosed embodiments that are still within the scope of the appended claims.

What is claimed is:

1. A camera testing apparatus comprising:
    a frame assembly;
    a control unit;
    a plurality of first light sources coupled to the frame assembly and in communication with the control unit, wherein each of the plurality of first light sources is in one of an illuminated first state or a non-illuminated second state, and wherein each of the plurality of first light sources is adapted to be within a field of vision of a camera disposed remote from the plurality of first light sources; and
    a plurality of second light sources coupled to the frame assembly and in communication with the control unit, wherein each of the plurality of second light sources is in one of an illuminated first state or a non-illuminated second state, and wherein each of the plurality of second light sources is adapted to be within the field of vision of the camera disposed remote from the plurality of second light sources, wherein the control unit sends a first command to each of the plurality of first light sources to change a first operational parameter of any or all of the plurality of first light sources, wherein the first operational parameter of any or all of the plurality of first light sources changes upon receiving the first command, and wherein the control unit sends a second command to a first one of the plurality of second light sources to illuminate at a first brightness and a third command to a second one of the plurality of second light sources to illuminate at a second brightness that is different than the first brightness, wherein the first one of the plurality of second light sources illuminates at the first brightness upon receiving the second command and the second one of the plurality of second light sources illuminates at the second brightness upon receiving the third command.

2. The camera testing apparatus of claim 1, wherein the first operational parameter is a state of illumination of any or all of the plurality of first light sources, and wherein changing the first operational parameter of any or all of the plurality of first light sources includes (a) changing any or all of the plurality of first light sources from the illuminated first state to the non-illuminated second state or (b) changing any or all of the plurality of first light sources from the non-illuminated second state to the illuminated first state.

3. The camera testing apparatus of claim 2, wherein the control unit includes a first driver in communication with each of the plurality of first light sources, and wherein each of the plurality of first light sources is an LED, wherein the first driver is in communication with a first one of the plurality of first light sources and with a second one of the plurality of light sources, and wherein the state of illumination of the first one of the plurality of first light sources changes at a first frequency and the state of illumination of the second one of the plurality of first light sources changes at second frequency.

4. The camera testing apparatus of claim 3, wherein the first driver includes a timing circuit and wherein the first frequency is equal to the second frequency, and wherein a phase of the first frequency is shifted relative to the second frequency, or wherein the first driver includes a timing circuit and wherein the first frequency is lower than the second frequency.

5. The camera testing apparatus of claim 1, wherein the first operational parameter is the output intensity of any or all of the plurality of first light sources, and wherein changing the first operational parameter of any or all of the plurality of first light sources includes (a) changing any or all of the plurality of first light sources from a first output intensity to a second output intensity or (b) changing any or all of the plurality of first light sources from the second output intensity to the first output intensity.

6. The camera testing apparatus of claim 1, wherein the first command is generated by a program that is saved to a memory of the control unit.

7. The camera testing apparatus of claim 1, wherein each of the plurality of first light source is a bar light source including two or more point-sources of light disposed along a linear axis, and wherein each of the two or more point-sources of light are LEDs.

8. The camera testing apparatus of claim 1, wherein each of the plurality of second light sources has an illuminated area that uniformly illuminates, wherein the illuminated area is round and has a diameter between 0.25" and 6", and wherein each of the plurality of second light sources includes a light tube having a first end and a second end, a plurality of LEDs disposed at or adjacent to the first end of the light tube, and a diffuser element disposed adjacent to the second end of the light tube.

9. The camera testing apparatus of claim 8, wherein a first group of the plurality of second light sources is arrayed in an "X" shape.

10. The camera testing apparatus of claim 1, wherein the control unit includes a first processor and a second processor, and wherein each of the plurality of first light sources is in communication with the first processor and each of the plurality of second light sources is in communication with the second processor.

11. The camera testing apparatus of claim 1, wherein each of the plurality of second light sources includes an array of LEDs, and the control unit includes at least one second driver, and wherein the array of LEDs are disposed adjacent to the at least one second driver.

12. The camera testing apparatus of claim 11, wherein the second driver includes a Hall effect sensor to monitor a magnetic field intensity associated with a current draw of the array of LEDs, wherein the second driver includes an optical sensor to sense a stability of the array of LEDs, wherein the second driver includes an aperture disposed adjacent to the array of LEDs, wherein the optical sensor is positioned to detect light from the array of passing through the aperture to regulate the temperature of the array of LEDs, and wherein the second driver includes an optical sensor to sense a stability of the array of LEDs.

13. The camera testing apparatus of claim 11, wherein the second driver includes a current regulator to control the stability of the array of LEDs, and wherein the second driver includes a microcontroller to adjust the current regulator according to an output signal from one or both of the Hall Effect sensor or the optical sensor.

14. The camera testing apparatus of claim 1, wherein the control unit includes a first processor, and wherein each of the plurality of first light sources is in communication with the first processor and each of the plurality of second light sources is in communication with the first processor.

15. The camera testing apparatus of claim 1, wherein the control unit is located remote from the frame assembly, wherein the camera is supported by a camera support, and wherein the camera support is coupled to the frame assembly.

16. The camera testing apparatus of claim 15, wherein an alignment fixture is coupled to the camera support, wherein the alignment fixture includes a bracket having an alignment portion fixed to the camera support, and wherein the or one or more first alignment features are coupled to the alignment portion, wherein the first alignment features cooperate with one or more second alignment features disposed remote from the first alignment features to position the camera, and wherein the one or more first alignment features are one or more lasers and the one or more second alignment features are one or more corresponding apertures or markings on the frame assembly.

17. The camera testing apparatus of claim 1, wherein each of the plurality of first light sources is disposed within a vertical plane, wherein at least a portion of each of the plurality of second light sources is disposed within the first plane, and wherein the first plane is vertical.

18. The camera testing apparatus of claim 1, wherein the control unit is coupled to the frame assembly.

19. The camera testing apparatus of claim 1, wherein the control unit varies a frequency in which each of the plurality of first light sources changes from the first state to the second state or from the second state to the first state.

20. The camera testing apparatus of claim 1, wherein a brightness of a first one of the plurality of second light sources is different than a brightness of a second one of the plurality of second light sources when the first one and second one of the plurality of second light sources is in the first state.

21. The camera testing apparatus of claim 1, wherein the control unit varies a brightness of each of the plurality of second light sources when each of the plurality of second light sources is in the first state, wherein the axis of each of two or more of the plurality of first light sources is disposed parallel to a vertical axis, and wherein the plurality of second light sources is arrayed in a circular pattern that surrounds the first group of the plurality of first light sources.

22. The camera testing apparatus of claim 1, wherein a lens portion of the camera is disposed within an illuminated central aperture formed through a body of a veiling light apparatus, and wherein the central aperture is defined by a cylindrical aperture wall, and wherein a plurality of light sources provide a uniform light through the aperture wall.

23. The camera testing apparatus of claim 1, wherein the control unit sends a fourth command to any or all of the plurality of second light sources to change a second operational parameter of any or all of the plurality of second light sources, wherein the first operational parameter is different than the second operational parameter.

24. The camera testing apparatus of claim 1, wherein the control unit sends a forth command to a third one of the plurality of second light sources to illuminate at a third brightness that is different than the first brightness and the second brightness, and wherein the third one of the plurality of second light sources illuminates at the third brightness upon receiving the fourth command and the third one of the plurality of second light sources illuminates at the third brightness upon receiving the fourth command.

25. A method of testing a camera, the method comprising:
sending a first signal from a control unit to a first light source to change the first light source from an illuminated first state to a non-illuminated second state, wherein the first light source is coupled to a frame assembly disposed remote from the camera;
changing the state of the first light source from the illuminated first state to the non-illuminated second state;
sending a second signal from the control unit to the first light source to change from the non-illuminated second state to the illuminated first state;
changing the state of the first light source from the non-illuminated second state to the illuminated first state;
sending a third signal from the control unit to a second light source to change from an illuminated first state to a non-illuminated second state; and
changing the state of the second light source from the illuminated first state to the non-illuminated second state;
activating the camera disposed remote from the frame assembly such that an image generated by the camera includes the first light source, wherein a picture generated by the camera includes the first light source and the second light source; and
analyzing the image generated by the camera for a testing parameter.

26. The method of claim 25, further comprising:
sending a fourth signal from the control unit to the second light source to change from the non-illuminated second state to the illuminated first state; and
changing the state of the second light source from the non-illuminated second state to the illuminated first state.

27. The method of claim 25, wherein the testing parameter is one of camera resolution or light sensitivity.

* * * * *

UNITED STATES PATENT AND TRADEMARK OFFICE
CERTIFICATE OF CORRECTION

PATENT NO. : 9,451,247 B2
APPLICATION NO. : 14/550670
DATED : September 20, 2016
INVENTOR(S) : Fan He et al.

Page 1 of 1

It is certified that error appears in the above-identified patent and that said Letters Patent is hereby corrected as shown below:

In the Claims

At Column 15, Line 7, "command, and" should be -- command, --.

At Column 15, Line 13, "brightness," should be -- brightness, and --.

At Column 15, Line 59, "source is" should be -- sources is --.

At Column 16, Lines 50-51, "or one or more" should be -- one or more --.

At Column 18, Line 17, "state; and" should be -- state; --.

Signed and Sealed this
Second Day of May, 2017

Michelle K. Lee
*Director of the United States Patent and Trademark Office*